No. 826,976. PATENTED JULY 24, 1906.
J. F. WAGNER & J. H. WESTON.
SOLDERING IRON.
APPLICATION FILED FEB. 7, 1906.

WITNESSES:

INVENTORS
J. F. Wagner
J. H. Weston
BY
Attorney

UNITED STATES PATENT OFFICE.

JOHN F. WAGNER AND JAMES H. WESTON, OF TAMAQUA, PENNSYLVANIA.

SOLDERING-IRON.

No. 826,976.  Specification of Letters Patent.  Patented July 24, 1906.

Application filed February 7, 1906. Serial No. 299,924.

*To all whom it may concern:*

Be it known that we, JOHN F. WAGNER and JAMES H. WESTON, citizens of the United States, residing at Tamaqua, in the county of Schuylkill and State of Pennsylvania, have invented new and useful Improvements in Soldering-Irons, of which the following is a specification.

This invention relates to improvements in soldering-irons, and has particular relation to devices of this character in which the solder is contained within the iron.

The invention has for its main object the provision of a soldering-iron which can be readily used when held in any position and retained under the control of the operator without liability of the solder escaping from the iron to the injury of the operator. To obtain this result, the operator is relieved from any requirement of manipulation of the solder, he being required only to control the passage of the solder to the tip as respects time and amount, the solder being held under pressure with a constant tendency to pass from its reservoir.

A further object is to provide a construction which is simple and efficient in operation, not liable to become disarranged, and which can be manufactured at a comparatively low cost.

To these and other ends, the nature of which will be readily perceived as the invention is hereinafter disclosed, said invention consists in the improved construction and combination of parts hereinafter fully described, particularly pointed out in the appended claims, and illustrated in the accompanying drawings, in which—

Figure 1:
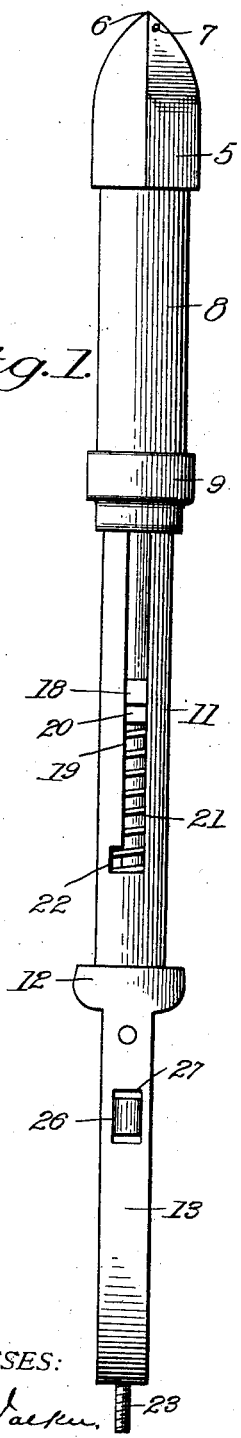
Figure 2:
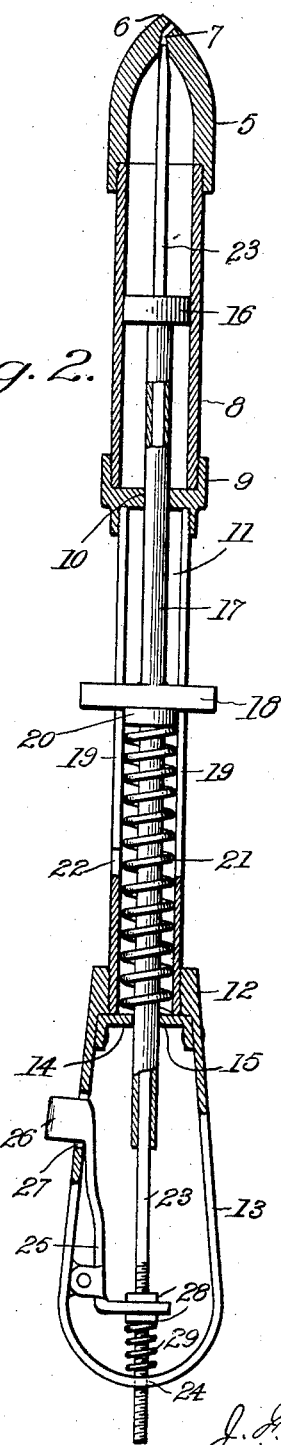

Figure 1 is a view in elevation of a soldering-iron constructed in accordance with our invention. Fig. 2 is a longitudinal sectional view of the same.

Similar reference characters indicate similar parts in all of the views.

The soldering-iron shown consists, substantially, of the head, body portion, and handle. The head 5 is of the usual configuration, having the tip 6, and is formed hollow, as shown. Its rear end is internally screw-threaded for attachment to the tubular portion 8 of the body portion of the iron, as shown in Fig. 2. The head is further provided with a passage-way 7, formed, as shown, for the passage of the solder from the solder-receptacle to a point adjacent to the tip 6.

The body portion of the iron consists of the tubular portion 8, forming with the hollow portion of the head the solder-receptacle, the cap 9, screw-threaded to the lower end of the solder-receptacle and having a central opening 10 for a purpose hereinafter described, and a tubular portion 11, screw-threaded to an annular projection carried by the cap 9.

The handle portion consists of the collar 12, screw-threaded to the lower end of the tubular portion 11, said collar carrying a U-shaped handle portion 13 and a strap portion 14, extending across the open end of the portion 11, the strap 14 having an opening 15.

The mechanism for feeding the solder and controlling its feed is as follows: Within the solder receptacle or reservoir is mounted a piston or plunger 16, adapted to reciprocate longitudinally of the receptacle. The piston-head may be of any suitable material adapted to withstand heat and is mounted on the end of a hollow stem 17, which extends through the opening 10 of the cap, the tubular portion 11, the opening 15 of the strap, and into the open portion of the handle. At a suitable point, approximately midway of its length, is secured a cross-bar 18, (hereinafter termed the "locking-bar,") which extends laterally through slots 19, formed longitudinally in the tubular portion 11. A collar 20 is mounted on the stem 17 below the locking-bar 18, and between said collar 20 and the strap 14 is mounted a spring 21, as best shown in Fig. 2. As the stem 17 is adapted to reciprocate freely it will be readily understood that the spring 21 will constantly exert a pressure on the piston to move it toward the head 5, and any contents of the solder-receptacle will be subjected to the same pressure. To permit of the piston being held retracted, as when it is desired to renew the solder in the solder-receptacle, a lateral recess 22 is formed in the tubular portion 11, extending from each of the slots 19, one of said recesses being shown in Fig. 1. When the stem is moved rearward by the movement of the locking-bar toward the handle, compressing the spring 21, said spring and the piston can be held in that position by slightly turning the locking-bar and piston, so as to cause the said bar to engage the recesses 22. In this position the piston is at the lower end of the solder-receptacle, and a removal of the head 5 permits of the recharging of the receptacle.

In order that the solder-feed may be controlled, we provide a rod 23, having its forward end pointed and adapted to fit within the passage-way 7 and close the same. The rod 23 extends through the stem 17 and through an opening 24, formed in the U-shaped portion of the handle, and has its rear end screw-threaded, as shown. It is given a longitudinal movement by means of the L-shaped lever 25, which is pivotally mounted within the handle, one end of the lever being formed to be engaged by nuts 28 on the rod 23, the other end having a projection 26, which extends through an opening 27 in the handle. The position of the lever 25 relative to the rod 23 is secured by the nuts 28, mounted on the rod 23. Between the lower nut 28 and the U-shaped portion of the handle is mounted a spring 29, which tends to keep the end of the rod 23 within the passage-way 7, thereby closing the receptacle. The rod 23 is moved in the opposite direction by a slight pressure placed on the projection 26, thus opening the passage-way 7 and permitting the solder to escape. By this construction it will be seen that the solder-receptacle is normally closed against the escape of solder, permitting the iron to be moved in any direction without liability of the operator being injured or damaged by the molten solder. Furthermore, by holding the solder under constant pressure it will be retained at the heated end of the receptacle and not subjected to chilling action such as would result were the solder permitted to move backward in the receptacle after the delivery of solder through the passage-way 7. As the heated portion of the iron is the head, it will be obvious that if the solder is retained constantly in contact with the head the chilling action will not result, thereby dispensing with the use of a large soldering-head. A further advantage in the use of the constant pressure on the solder is the fact that there is no liability of the entrance of air or acid such as might result were the piston withdrawn after each delivery of solder, the pressure practically sealing the passage-way against the entrance of air or acid by maintaining the solder in close contact with the head. This exerting of pressure is in no wise interfered with by the presence of the rod 23 within the solder-receptacle, and the location of the spring 21 outside of the receptacle prevents any liability of its being affected by the use of the iron, and owing to the inability of the solder to escape excepting when the passage-way 7 is open and the fact that there is a constant pressure being exerted to force the solder from its receptacle it will be readily understood that the iron can be used with perfect safety in operating on overhead work, the quantity of solder discharged being entirely under the control of the operator, who is required only to release the pressure exerted on the projection 26, thereby permitting the passage-way to be closed by the action of the spring 29.

It will be understood that after being charged by the insertion of the solder in the solder-receptacle, the solder being, if desired, in the form of a stick with a longitudinal opening to permit of the passage of the rod 23, the heating of the head will cause the solder to melt so that the spring will cause it to accumulate in the head ready for use, as above indicated. A slight pressure on the projection 26 by the operator will permit the desired quantity to escape, a release of the projection serving to cut off the supply.

Having thus described our invention, what we claim as new is—

1. In a soldering-iron, a soldering head and tip, a solder receptacle or reservoir in rear of said tip, said head having a passage-way to permit the escape of solder from said reservoir to the tip, a tension device for exerting pressure on the solder within the reservoir, and a valve, normally closed, for controlling said passage-way.

2. In a soldering-iron, a soldering head and tip, a solder receptacle or reservoir in rear of said tip, said head having a passage-way to permit the escape of solder from said reservoir to the tip, a spring-actuated piston in said reservoir for exerting pressure on the solder in the reservoir, and a valve, normally closed, for controlling the passage of solder through said passage-way.

3. In a soldering-iron, a hollow soldering head and tip, a solder receptacle or reservoir in rear of said tip, said reservoir being normally closed, said head having a passage-way to permit the escape of solder from said reservoir to the tip, means for retaining the solder in close contact with the inner walls of said head adjacent to said passage-way to prevent the entrance of air or acid therethrough, and means for controlling the passage of solder through said passage-way.

4. In a soldering-iron, a soldering head and tip, a solder receptacle or reservoir in rear of said tip, said reservoir consisting of a tubular portion secured to said head and a piston located therein, a passage-way formed in said head for the escape of solder to said tip, a spring for exerting pressure on said piston to retain the solder in juxtaposition to said passage-way, said spring being located without the reservoir, a locking-bar for the piston, and a valve for controlling said passage-way.

5. In a soldering-iron, the combination with a solder receptacle or reservoir having an outlet-opening, of a spring-actuated piston or plunger for exerting pressure on the solder within the receptacle, said plunger being designed to effect the discharge of solder from said reservoir, said plunger comprising a hollow rod or spindle, a piston thereon, and a rod passed through said spindle and piston for regulating the flow of metal through said outlet-opening.

6. In a soldering-iron, a solder-reservoir, an outlet-opening leading therefrom, a piston or plunger mounted to reciprocate in said reservoir, and a valve for controlling the flow of solder through said opening, said plunger and valve being both spring-actuated.

7. In a soldering-iron, a solder-reservoir, an outlet-opening leading therefrom, a spring-actuated piston or plunger mounted to reciprocate in said reservoir, said piston normally exerting pressure on the solder to discharge it through said opening, a spring-actuated valve for controlling said opening, said valve being normally closed, and a lever for moving said valve to permit of the passage of solder, whereby the discharge of solder from said reservoir is controlled solely by the movement of said lever.

In testimony whereof we have affixed our signatures in presence of two subscribing witnesses.

JOHN F. WAGNER.
JAMES H. WESTON.

Witnesses:
SAMUEL R. BEARD,
FRANKLIN SCHULTZ.